Patented Jan. 16, 1923.

1,442,406

UNITED STATES PATENT OFFICE.

RUDOLF HENNICKE, OF SALZDETFURTH, NEAR HILDESHEIM, GERMANY, ASSIGNOR OF ONE-HALF TO KALIWERKE SALZDETFURTH AKTIENGESELLSCHAFT, OF SALZDETFURTH, GERMANY.

PROCESS OF OBTAINING FROM ANHYDRITE A SUBSTANCE WHICH SETS IN THE PRESENCE OF WATER.

No Drawing. Application filed April 4, 1921. Serial No. 458,587.

*To all whom it may concern:*

Be it known that I, RUDOLF HENNICKE, a citizen of the German Empire, and residing at Salzdetfurth, near Hildesheim, in the State of Prussia, German Empire, have invented certain new and useful Improvements in Processes for Obtaining from Anhydrite a Substance which Sets in the Presence of Water, of which the following is a specification.

The subject matter of the present invention is a process for obtaining from anhydrite a substance which sets after the addition of water thereto.

It is possible to obtain from naturally occurring gypsum by heating the well known burnt gypsum which is a widely used setting or solidifying substance (plaster of Paris). If naturally occurring gypsum be highly heated, a medium which sets, the so-called Estrich gypsum, can likewise be obtained.

Calcium sulphate in the anhydrous state known by the name of anhydrite, which occurs in great quantities in nature, could not hitherto be converted in a simple technical way into a substance which sets, and which like the ordinary commercial gypsum can be stored, transported and used anywhere by simply stirring it up with water, and a good hard cast obtained therefrom. Anhydrite occurs in great quantities in nature and can be obtained in a convenient manner by mining in the open. It is also obtained in great quantities as a kind of gangue in the mining of potash. In many cases the natural gypsum is found as a top layer which is utilized for the preparation of the commercial gypsum which sets. Underneath the natural gypsum there occurs in many cases anhydrite, which hitherto has not been utilized, as it could not be practically converted on a large scale. In consequence of this therefore after the natural gypsum on the top has been removed the work at the particular place had to be abandoned and the anhydrite was in many cases left alone.

According to this invention it is possible in a simple way to so change the anhydrite that a commercial product is obtained which when set behaves, in respect of the method of treatment required, the possibility of regulating the time it takes to set in the presence of retarding or accelerating additions, and also in respect of the properties of the finished product, in practically the same manner as the ordinary commercial gypsum.

According to this invention the anhydrite is preferably hydrated in a finely ground state with water, to which there may be added for the purpose of accelerating the process, certain substances which act as catalysts. Such substances are numerous salts, particularly alkali salts and earth alkali salts, and then bases and acids, as sulphuric acid or hydrochloric acid. The substances may be added singly or in a mixed state. Also one of such substances may be added first and then later one or more of the others may be added. When hydration is complete the catalysts may be washed out with water and if necessary used over again or in certain cases the catalysts may be left in the mass.

If it be desired to recover the catalysts and obtain a pure product, the mass is freed from liquid by filtration after hydration is complete and the catalysts are recoverd in a suitable manner such as by being washed out. The washing of the product has a certain advantage in its subsequent treatment because the purer the final product is, the more easily can it be ground, in fact when in a particularly pure state it almost falls to powder of itself. This is in contradistinction to other processes, where the addition of salts of the kind mentioned, particularly sulphates, exerts, as is known, a certain hardening action on a composition obtained from anhydrite by mixing it with water.

The quantity of catalysts and the quantity of water used and also the time of hydration depends entirely upon the nature of the anhydrite. In like manner the degrees suitable for desintegration, depend on the origin and nature of the anhydrite. Thus for example the anhydrite present in potash deposits needs to be less finely ground than the raw anhydrite obtained by open mining. Furthermore it is not necessary, in the hydration of the first mentioned kind of anhydrite to add catalysing salts to the water, because this anhydrite usually contains such salts due to the presence of potash, and in other respects is also free from certain substances which hinder hydration, and which in the case of anhydrite obtained by open mining are rendered innocuous by the above mentioned catalysts, particularly those with acid properties.

The hydrated product is now heated under ordinary pressure or under pressure below atmospheric (in vacuo) and at the same time dried. The time required for treatment depends on the temperatures employed, and within certain limits, the time of heating becomes shorter as the temperature rises. In the practical carrying out of the process it is well in most cases to employ temperatures between about 80° C. and 170° C., although the process can notwithstanding be satisfactorily carried out more or less, at temperatures lying outside this range. If a temperature of 170° C. be considerably exceeded, the product suffers in quality and even does not practically set. On the other hand at very high temperatures, at about a red heat, a product which can be used and will set satisfactorily is again obtained.

After the heating is over the product is ground and may be used alone or with suitable additions which for example influence the time taken to set or the hardness of the resultant cast.

The first stage of the process, the hydration, may be conveniently carried out by mixing the finely ground anhydrite with a suitable quantity of water, to which for the purpose of accelerating the hydration suitable catalysts such for example as magnesium sulphate, potassium sulphate carnalite, alum, acids or other substances may be added either singly or mixed together. Lime, in the form of milk of lime for example, may also be used.

In some cases it is advisable, in order to accelerate the hydration to heat the mass. Some kinds of anhydrite which are difficult to hydrate, may be conveniently first heated with water to which a suitable quantity of hydrochloric acid has been added. The liquid is afterwards run off, the mass washed with water and the hydration then continued by means of a suitable salt solution, or the corresponding salts, such as magnesium sulphate, potassium sulphate, etc., added directly to the acid suspension of the anhydrite in either a solid or a dissolved form.

After the hydration is complete the product obtained is heated under ordinary pressure or in vacuo. The temperature of the heating will depend essentially on the sources of heat available, so that exhaust steam or other waste heat from other technical processes can be employed with advantage.

The finished and dried product, if it does not disintegrate sufficiently of itself, is ground and is then ready to be transported or used. If it is desired, for certain purposes, to accelerate the normal time taken by the product to set, this can be effected by the addition of suitable substances, which are already partly known for use for the same purpose with the gypsum of commerce, such for example as potassium sulphate, potassium hyposulphate and others besides. On the other hand the process of setting can be retarded by the addition of substances also used in connection with ordinary commercial gypsum for this purpose, e. g., borax, glue, and the like. Lime may also be used with advantage. The added substances may be added to the finished product prior to marketing or on the spot when it is being used.

The hardness of the product when set can also be increased by the addition of suitable substances well known for use with gypsum. Thus for example borax and potassium sulphite are suitable both for retarding the time taken by the product to set and for increasing the hardness of the finished article.

A particular advantage of the process is that it can be repeated on used material; that is to say the finished product after it has set can be subjected to the process again and thus brought to a reconstituted condition in which it can be used again. Thus for example moulds of the product produced according to the present process, after they have set and are no longer required and which otherwise like the gypsum moulds, uselessly accumulate can be ground up again and, as far as is necessary rehydrated by the aid of water with or without catalysts and then dried again according to the second stage of the process. In this treatment of the material, dehydration of the anhydrite which is present in the moulds in a hydrated state takes place in such a way that the dehydrated anhydrite can be used again at once with water and yields a product which sets.

The mixture of gypsum and anhydrite which occurs naturally in great quantities in the mining of gypsum can also be worked up by the present process into a product which will set. These mixtures of gypsum and anhydrite have been hitherto dumped on to the spoil heaps as owing to the more or less large quantity of anhydrite which they contain they cannot be made to yield a useful product by the usual process of gypsum burning.

What we claim and desire to secure by Letters Patent of the United States is:

1. In the process of making a hydraulic substance from anhydrite, the steps which consist in treating the raw anhydrite with a hydrating agent, and then heating the hydrated anhydrite.

2. In the process of making a hydraulic substance from anhydrite, the steps which consist in treating the raw anhydrite with water in the presence of a catalyzer, and then heating the hydrated anhydrite.

3. In the process of making a hydraulic substance from anhydrite, the steps which consist in treating raw anhydrite with water and a catalyzer, extracting the catalyzer, and heating the residue.

4. In the process of making hydraulic substance from anhydrite, the steps which consist in treating the raw anhydrite with water and a catalyzer, extracting the catalyzer, and heating the residue between 80° and 170° cent.

5. In the process of making a hydraulic substance from anhydrite, the steps which consist in treating raw anhydrite with water and a soluble catalyzer, heating, extracting the catalyzer, heating the residue under reduced pressure, and grinding.

6. In the process of making a hydraulic substance from anhydrite, the steps which consist in treating raw anhydrite with water and a soluble catalyzer, heating, extracting the catalyzer, further treating with water and a different catalyzer, extracting the second catalyzer, and finally heating and grinding the residue.

7. In the process of making a hydraulic substance from anhydrite, the steps which consist in treating raw anhydrite with water and a soluble catalyzer, heating, extracting the catalyzer, further treating with a second catalyzer, extracting the second catalyzer, and finally heating under reduced pressure and then grinding.

8. In the process of making a hydraulic substance from anhydrite, the steps which consist in treating ground raw anhydrite with a succession of catalyzing bodies, and extracting each catalyzing body before adding the succeeding one.

9. In the process of making a hydraulic substance from anhydrite, the steps which consist in treating ground raw anhydrite with a succession of catalyzing bodies, extracting each catalyzing body before adding the succeeding one, finally washing, and heating the residue to between 80° to 170° cent.

10. The process of making a hydraulic substance from non-hydraulic anhydrite, which consists in modifying the anhydrite by means of hydrating and catlyzing agents, extracting said agents, heating, regrinding and mixing with setting agents.

11. The process of making a hydraulic substance from non-hydraulic anhydrite, which consists in treating the crushed raw anhydrite with hydrating and catalyzing agents, extracting said agents, heating the residue, retreating with catalyzing agents, again heating, regrinding, and mixing the product with setting agents.

12. The process of making a hydraulic substance from non-hydraulic anhydrite which consists in treating the crushed raw anhydrite with hydrating and catalyzing agents, extracting said agents, heating the residue and treating it with water sufficient for a substantial setting, crushing the so obtained solid mass and heating it.

13. As a new article of manufacture, a modified anhydrite having hydraulic properties consisting of anhydrite residue after the extraction of the modifying agent, and after heating.

14. As a new article of manufacture, a modified anhydrite having hydraulic properties consisting of the residue of anhydrite after extraction of the modifying agent, and compounded with setting agents.

15. As a new article of manufacture, a modified anhydrite having hydraulic properties, consisting of the residue of anhydrite after extraction of the modifying agent, and after heating, and compounded with a setting agent.

In testimony whereof I have affixed my signature in presence of two witnesses.

RUDOLF HENNICKE.

Witnesses:
JOHANNES FRITZE,
GEORGE LIEBIG.